(12) United States Patent
Takahashi et al.

(10) Patent No.: US 7,637,545 B2
(45) Date of Patent: Dec. 29, 2009

(54) COLLISION DETECTION APPARATUS

(75) Inventors: Hisashi Takahashi, Kariya (JP);
Takatoshi Tanabe, Ichinomiya (JP)

(73) Assignee: Denso Corporation, Kariya (JP)

( * ) Notice: Subject to any disclaimer, the term of this patent is extended or adjusted under 35 U.S.C. 154(b) by 309 days.

(21) Appl. No.: 11/728,594

(22) Filed: Mar. 26, 2007

(65) Prior Publication Data
US 2007/0222236 A1 Sep. 27, 2007

(30) Foreign Application Priority Data
Mar. 27, 2006 (JP) ............................. 2006-085764

(51) Int. Cl.
*B60R 19/26* (2006.01)
(52) U.S. Cl. .................... 293/132; 340/436; 701/45
(58) Field of Classification Search ........... 293/132; 280/735; 180/274–280; 701/45–47; 340/436, 340/435, 536
See application file for complete search history.

(56) References Cited

U.S. PATENT DOCUMENTS

2005/0116817 A1 6/2005 Mattes et al.
2006/0087417 A1 4/2006 Kiribayashi
2007/0090931 A1* 4/2007 Hawes et al. ............... 340/436

FOREIGN PATENT DOCUMENTS

| DE | 2 303 778 | 9/1973 |
| DE | 84 33 405 | 5/1985 |
| DE | 197 28 288 | 2/1999 |
| DE | 101 14 465 | 9/2002 |
| DE | 103 31 862 | 2/2005 |

OTHER PUBLICATIONS

Office Action dated Jan. 31, 2008 in German Application No. 10 2007 006848.6-21 with English translation thereof.

* cited by examiner

*Primary Examiner*—Lori L Lyjak
(74) *Attorney, Agent, or Firm*—Harness, Dickey & Pierce, PLC

(57) ABSTRACT

A collision detection apparatus has a support member which is fixed to side members of a vehicle, an absorber which is arranged at a vehicle front side of the support member to define a space therebetween, a chamber member defining therein a chamber space which is substantially sealed, and a pressure sensor for detecting a pressure in the chamber space. The chamber member is arranged in the space defined between the absorber and the support member. A collision of the vehicle is detected based on a variation in the pressure of the chamber space.

20 Claims, 3 Drawing Sheets

US 7,637,545 B2

COLLISION DETECTION APPARATUS

CROSS REFERENCE TO RELATED APPLICATION

This application is based on a Japanese Patent Application No. 2006-085764 filed on Mar. 27, 2006, the disclosure of which is incorporated herein by reference.

FIELD OF THE INVENTION

The present invention relates to a collision detection apparatus.

BACKGROUND OF THE INVENTION

Generally, it is desirable to protect not only a passenger in a vehicle but also a pedestrian from being injured due to a collision of the vehicle. As a protection device for the pedestrian in the collision, it is proposed to reduce an impact on the pedestrian when the pedestrian collides with the vehicle and falls onto a bonnet of the vehicle. In this case, it becomes important to detect a collision between the vehicle and the pedestrian for the protection device.

For example, a collision detection unit for a vehicle is disclosed in JP-T-2005-538881 (US 2005/0116817 A1). In this case, the vehicle is provided with a front sensor which is constructed of a contact sensor and has at least one cavity. The each cavity has therein a sensing element, by which the collision (of vehicle) related to the deformation of the cavity is detected.

However, in this case, the vehicle is provided with an additional sensor for detecting the collision between the vehicle and the pedestrian. That is, the front sensor disclosed in JP-T-2005-538881 is not suitable for the detection of the collision between the vehicle and the pedestrian.

With a reference to the above-described detection method, a collision detection apparatus for detecting a collision between the vehicle bumper and the pedestrian is considered, as shown in FIGS. 6 and 7. In this case, a space 20 which is sealed (i.e., hermetic space such as cavity in JP-T-2005-538881) is arranged between a bumper reinforcement member 1 and an absorber 2 positioned at a vehicle front side of the bumper reinforcement member 1. The collision of the pedestrian is detected based on a variation in a pressure in the space 20 by a pressure sensor 4.

In this case, it is required to maintain the hermeticity of the space 20 because the collision is detected according to the variation of the pressure of the closed space 20. That is, it is necessary for the bumper reinforcement member 1 and the absorber 2 are joined to each other over the whole circumference thereof.

Generally, the bumper reinforcement member 1 and the absorber 2 of the vehicle are constructed of metal such as iron or the like, and joined to each other by spot-welding. In order to maintain the hermeticity of the space 20 which is defined between the bumper reinforcement member 1 and the absorber 2, it is considered to weld the whole circumference of the joint therebetween.

However, the welding over the whole circumference will cause not only a cost increase but also a change of a squash property (deformation property in collision) of the absorber 2. Thus, a protection performance of a pedestrian foot portion of the absorber 2 in the collision with the pedestrian will be deteriorated. Moreover, the deformation of the absorber 2 may become insufficient. Thus, it is difficult to detect the collision of the vehicle with a satisfactory detection accuracy.

SUMMARY OF THE INVENTION

In view of the above-described disadvantages, it is an object of the present invention to provide a collision detection apparatus, which can be used to detect a collision between a bumper of a vehicle and a human, for example, a pedestrian.

According to the present invention, the collision detection apparatus has a first support member which is fixed to side members of a vehicle, a second support member which is arranged at a vehicle front side of the support member to define a space therebetween, a chamber member defining therein a chamber space which is substantially sealed, and a pressure sensor for detecting a pressure in the chamber space. The chamber member is arranged in the space defined between the first support member and the second support member. A collision of the vehicle is detected based on a variation in the pressure of the chamber space.

Preferably, the second support member is constructed of an absorber of the vehicle. That is, the collision detection apparatus can be mounted to a vehicle bumper to detect a collision between the vehicle bumper and an obstacle, for example, a pedestrian.

In this case, the collision is detected based on the variation of the pressure of the chamber space defined by the chamber member. The chamber member defining therein the chamber space in which the variation of the pressure is detected is constructed separately from the first support member and the second support member (i.e., absorber). That is, the hermeticity of the space defined by the first support member and the absorber is not required.

Moreover, the chamber member is arranged in the space defined between the first support member and the second support member (i.e., absorber). That is, the space between the first support member and the absorber is provided to house the chamber member, without being directly related to the collision detection. Thus, similarly, the high hermeticity of the space defined by the back plate and the absorber is not required. Therefore, it is unnecessary to join the back plate and the absorber over the whole circumference thereof. That is, the first support member and the absorber can be partly joined to each other by spot welding or the like. Accordingly, the manufacture cost can be reduced. Furthermore, because the joining spots between the first support member and the absorber are reduced, the change of the squash property of the absorber is reduced and the desirable detection property can be obtained.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

First Embodiment

Figure 1:
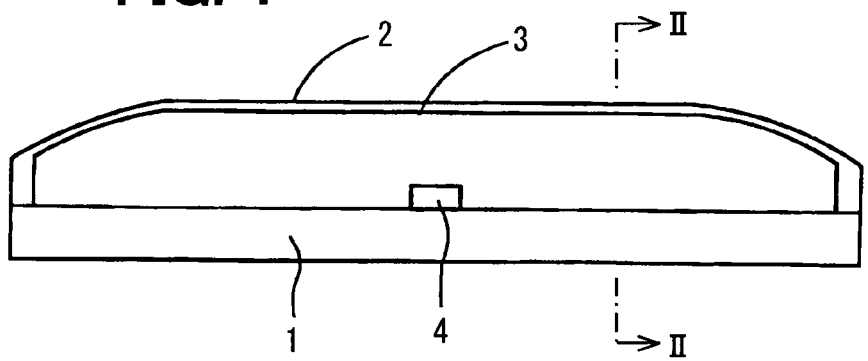
FIG. 1 is a schematic plan view showing a construction of a collision detection apparatus according to a first embodiment of the present invention.
Figure 2:
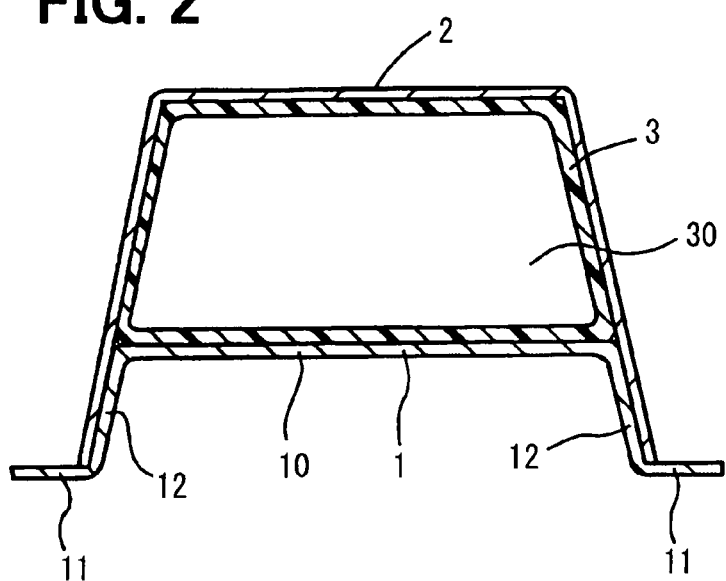
FIG. 2 is a schematic sectional view taken along a line II-II in FIG. 1.

A collision detection apparatus according to a first embodiment of the present invention will be described with reference to FIGS. 1-3. The collision detection apparatus can be suitably used for a vehicle, for example. As shown in FIGS. 1 and 2, the collision detection apparatus can include a first support member 1 (e.g., bumper reinforcement member), a second support member 2 (e.g., absorber), a chamber member 3, a pressure detection member 4 (e.g., pressure sensor) and a calculation unit (not shown). The absorber 2 can be arranged at the vehicle front side of the bumper reinforcement member 1 to define therebetween a space in which the chamber member 3 is housed. The pressure sensor 4 is arranged in a chamber space 30 defined by the chamber member 3.

The first support member 1 (back plate) can be fixed to a pair of side members Fm (e.g., front side members) of the vehicle. Thus, the collision detection apparatus can be used to detect a collision of a bumper of the vehicle, which has a bumper cover 5 covering the absorber 2 to construct the outer surface of the bumper.

The bumper reinforcement member 1 can be constructed of a metal band plate, for example. The bumper reinforcement member 1 extends substantially in the vehicle width direction, and has a bent shape when being viewed in the cross section thereof which is taken along the vehicle longitudinal direction (i.e., vehicle front-rear direction), as shown in FIG. 2.

That is, the band plate of the bumper reinforcement member 1 is shaped to have a middle portion 10 at a substantial middle of the width direction of the band plate, two end portions 11 which are respectively positioned at the width-direction ends of the band plate and disposed at the vehicle rear side of the middle portion 10, and connection portions 12 (having taper shape, for example) which are respectively arranged between the middle portion 10 and the end portions 11. In this case, the end portions 11 can be arranged to respectively protrude outwards from the connection portions 12.

The bumper reinforcement member 1 is fixed to the side members Fm of the vehicle in such a manner that the longitudinal direction (extending direction) of the bumper reinforcement member 1 is substantially along the vehicle width direction. The side members Fm can protrude to the vehicle front side of an engine cabin of the vehicle.

The absorber 2 for buffering an impact on the vehicle due to a collision or the like is attached to the bumper reinforcement member 1, and can be constructed of a metal band plate, for example. In this case, the absorber 2 extends substantially in the vehicle width direction, and has a substantial ⊐-like shape when being viewed in the cross section thereof taken along the vehicle longitudinal direction, as shown in FIG. 2.

The absorber 2 can be joined to the taper portions 12 of the bumper reinforcement member 1 by spot-welding, for example. Moreover, the two end portions of the longitudinal direction (extending direction) of the absorber 2 are joined to the bumper reinforcement member 1. That is, a closed space which is not sealed is defined between the absorber 2 and the bumper reinforcement member 1.

In this case, it is desirable that the chamber member 3 has such a periphery shape that the chamber member 3 (arranged in space defined by absorber 2 and bumper reinforcement member 1) contacts the absorber 2 and the bumper reinforcement member 1 with little gap. That is, it is desirable that the chamber member 3 has a shape substantially corresponding to that of the space defined by the back plate 1 and the absorber 2.

For example, as shown in FIGS. 1 and 2, the chamber member 3 can have a substantial cylinder shape (in vehicle width direction) to define therein the chamber space 30 which is substantially sealed. The chamber member 3 is arranged in the space defined between the absorber 2 and the bumper reinforcement member 1, in such a manner that the axis direction of the cylinder shape of the chamber member 3 is arranged substantially along the extending direction (i.e., vehicle width direction) of the absorber 2 and the bumper reinforcement member 1.

The pressure sensor 4 is arranged in the chamber space 30, to detect the pressure of fluid (such as air) in the chamber space 30. The pressure sensor 4 can be attached to the chamber member 3, for example.

The calculation unit is electrically connected with the pressure sensor 4 to calculate the pressure of the chamber space 30 based on detection signals of the pressure sensor 4, and determine whether or not there occurs a collision with the vehicle (e.g., bumper) according to the calculated pressure.

The calculation unit can be constructed of an available calculation unit of the vehicle, which has been provided for the vehicle. For example, the calculation unit can be constructed of a calculation unit of a passenger protection device or a pedestrian protection device of the vehicle.

According to this embodiment, for the manufacture of the collision detection apparatus, the bumper reinforcement member 1 can be fixed to the side members Fm (by screw fastening, for example). Then, the absorber 2 is mounted to the bumper reinforcement member 1 (by welding, for example), in such a state that the chamber member 3 provided therein the pressure sensor 4 is beforehand attached to the absorber 2 or the bumper reinforcement member 1.

Next, the collision detection of the collision detection apparatus according to this embodiment will be described.

Figure 3:
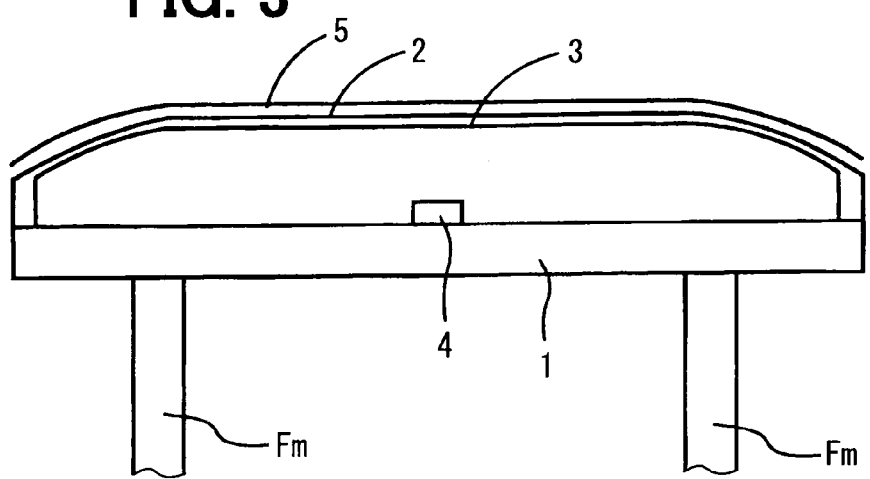
FIG. 3 is a schematic plan view showing the collision detection apparatus when being attached to a bumper of a vehicle according to the first embodiment.

As shown in FIG. 3, the collision detection apparatus can be mounted to the vehicle bumper, which has the bumper cover 5 covering the absorber 2 to construct the outer surface of the bumper. When an obstacle collides with the bumper, the bumper is pressed by the obstacle. Thus, the absorber 2 is pressed through the bumper cover 5 of the bumper.

In the case where a collision load applied to the absorber 2 is larger than a predetermined value, the absorber 2 is deformed (e.g., compressed) so that the length of the vehicle longitudinal direction (i.e., distance between opening portion and bottom portion of ⊐-like shape) of the absorber 2 becomes small. Thus, the bottom portion of the substantial ⊐-like shape of the absorber 2 is pressed against the chamber member 3, so that the chamber member 3 is compressed. Therefore, the pressure in the chamber space 30 increases. The variation in the pressure is measured by the pressure sensor 4, to be used for the collision detection by the calculation unit.

Thus, the calculation unit determines whether or not an obstacle collides with the vehicle based on the variation (increase) of the pressure. Moreover, the calculation unit can sort-discriminate the obstacle, based on the variation degree (variation ratio) of the pressure.

For example, the calculation unit can determine whether or not the obstacle is a human (e.g., pedestrian) or the like, or whether or not the obstacle is a hard structure such as other vehicle or the like. In this case, it is desirable that velocity data of the vehicle are also inputted into the calculation unit. When it is determined that there occurs the collision between the vehicle and the pedestrian, the pedestrian protection device such as a pedestrian protection airbag and a bonnet lifting device can be actuated to protect the pedestrian.

In this case, the material of the chamber member 3 is not limited. It is desirable that the chamber member 3 is made of such a material that a stress needed for the deformation of the chamber member 3 is small when a force is applied to the chamber member 3. Thus, the change of the squash property of the vehicle bumper which is adjusted by the absorber 2 is reduced even when the chamber member 3 is mounted.

According to this embodiment, the absorber 2 and the chamber member 3 are respectively made of materials which are separate from each other. The chamber space 30 can be made of a softer material (e.g., resin, metal) than that of the absorber 2. Thus, the deformation of the absorber 2 due to the collision is not restrained by the chamber member 3. Thus, the squash property of the absorber 2 is adjusted, so that the protection performance of the pedestrian foot portion in the collision can be maintained.

In this case, the collision is detected, by the detection of the pressure variation of the chamber space 30 due to the pressing of the chamber member 3 by the absorber 2. That is, if the chamber member 3 is made of a hard material, the stress for the deformation of the absorber 2 and the stress for the deformation of the chamber member 3 become necessary until the pressure of the chamber space 30 increases (i.e., chamber member is deformed). Because the squash property of the vehicle bumper is determined by that of the absorber 2, it is preferable that the stress for the deformation of the chamber member 3 is small. That is, because the chamber member 3 is made of a soft material, the influence on the protection of the pedestrian foot portion (in collision with pedestrian) due to the insertion of the chamber member 3 can be reduced. Therefore, the complexity of a tuning operation for obtaining the desirable collision property can be avoided.

According to this embodiment, the collision detection apparatus can be attached to the vehicle bumper. The determination of the collision is performed based on the variation of the pressure in the chamber space 30 of the chamber member 3. That is, the hermeticity of the space defined by the absorber 2 and the bumper reinforcement member 1 (back plate) is not required. Therefore, the absorber 2 and the bumper reinforcement member 1 can be joined to each other by spot welding or the like, so that the manufacture cost is reduced. Moreover, the welding spots of the absorber 2 and the bumper reinforcement member 1 can be decreased, thus restricting the change of the squash property of the absorber 2 in the welding operation. Accordingly, the detection accuracy can be improved.

Furthermore, the collision is detected based on the variation in the pressure of the chamber space 30 in the chamber member 3, which is constructed separately from the back plate 1 and the absorber 2. Thus, the collision detection apparatus can be manufactured with a lowered cost. Moreover, the change of the squash property of the absorber 2 in the manufacture can be restricted.

Second Embodiment

Figure 4:
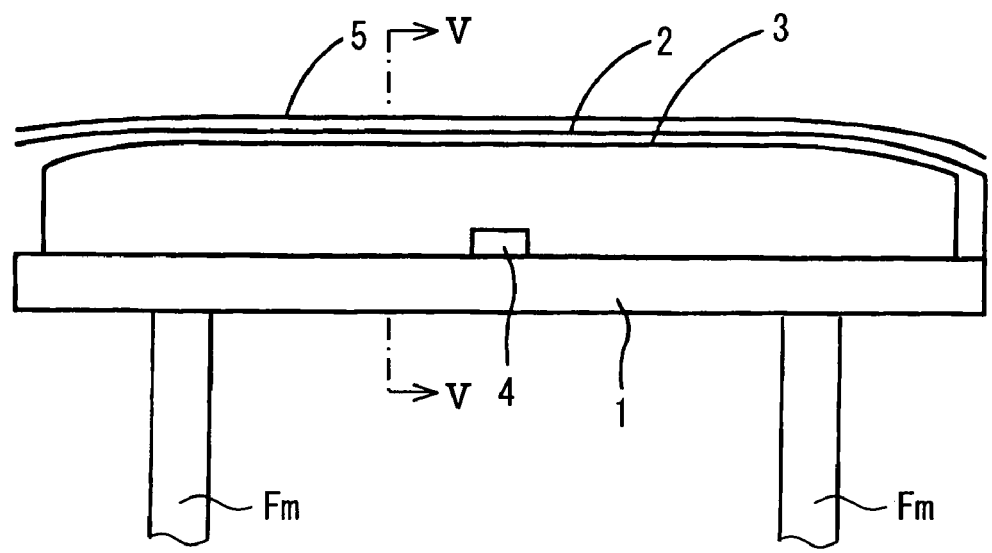
FIG. 4 is a schematic plan view showing a construction of a collision detection apparatus according to a second embodiment of the present invention.
Figure 5:
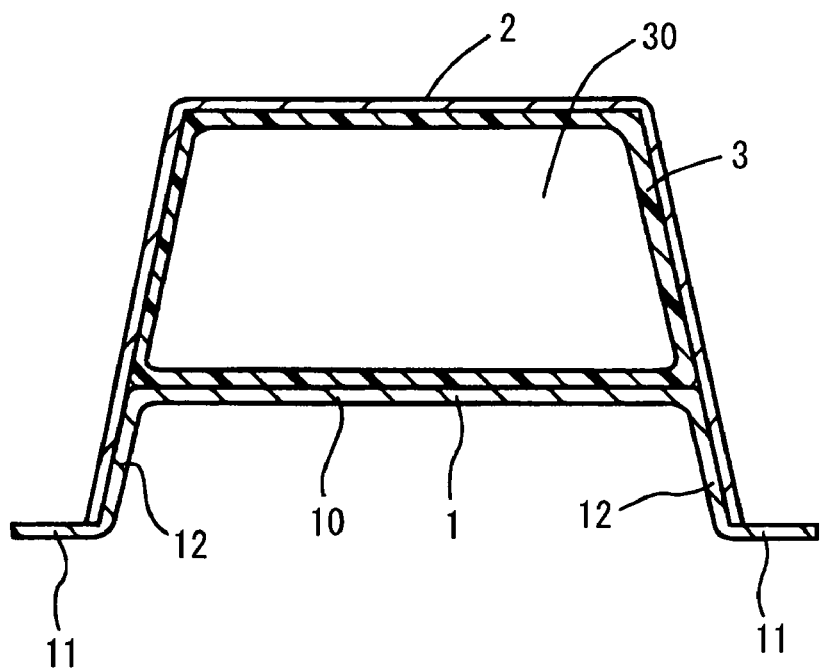
FIG. 5 is a schematic sectional view taken along a line V-V in FIG. 4.
Figure 6:
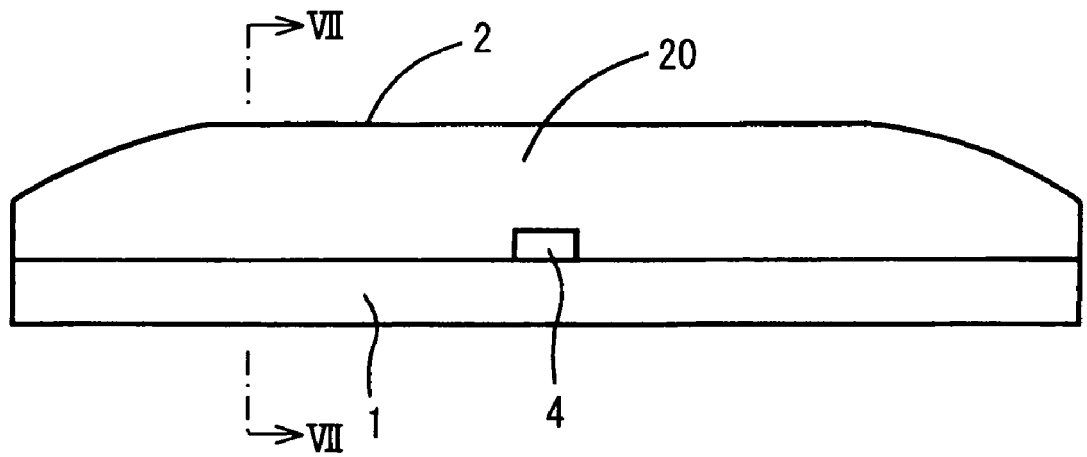
FIG. 6 is a schematic plan view showing a construction of a collision detection apparatus according to a related art.
Figure 7:
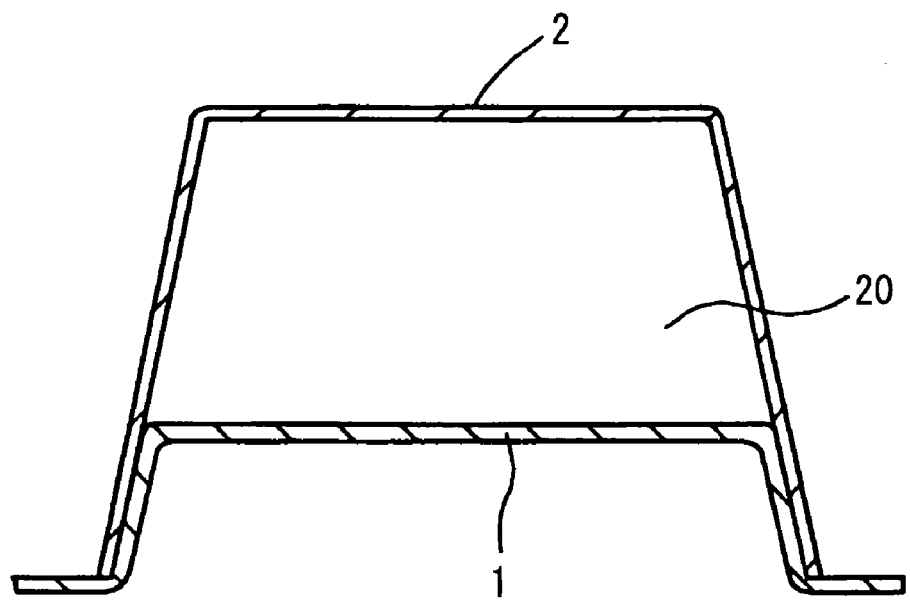
FIG. 7 is a schematic sectional view taken along a line VII-VII in FIG. 6.

A second embodiment of the present invention will be described with reference to FIGS. 4 and 5. In this case, the side members Fm and the bumper reinforcement member 1 (first support member) respectively have the same structures with those in the above-described first embodiment.

According to the second embodiment, the absorber 2 (second support member) is attached to the bumper reinforcement member 1, and can be constructed of a metal band plate, for example. The absorber 2 has the substantial ⊐-like shape when being viewed in the cross section thereof taken along the vehicle longitudinal direction, as shown in FIG. 5. In this case, the absorber 2 can be joined to the surface of the taper portions 12 of the bumper reinforcement member 1 by spot-welding, for example.

In this embodiment, the absorber 2 and the bumper reinforcement member 1 construct a substantial bottomed cylinder shape which has the axis direction substantially in the vehicle width direction.

That is, one of two end (of vehicle width direction) of the substantial cylinder shape is open, and the other of the two ends is closed. Alternatively, the two ends of the cylinder shape can be also open. Because the bumper reinforcement member 1 and the absorber 2 construct the substantial cylinder shape, the chamber member 3 can be inserted through the substantial cylinder-shaped opening to be readily mounted.

In this case, the chamber member 3 has the substantial cylinder shape and defines therein the chamber space 30. The chamber member 3 is inserted into the substantially cylinder-shaped space between the absorber 2 and the bumper reinforcement member 1 through the one end (opening end) of the space, so that the axis direction of the substantially cylinder-shaped chamber member 3 is substantially along the vehicle width direction.

The pressure sensor 4 is mounted in the chamber space 30 to measure the pressure variation of the chamber space 30. The calculation unit is connected with the pressure sensor 4 to calculate the pressure variation of the chamber space 30 based on the detection signals of the pressure sensor 4 and determine the collision occurrence according to the calculated pressure.

According to this embodiment, for the manufacture of the collision detection device, the bumper reinforcement member 1 is fixed to the side members Fm (by screw fastening or the like), and then the absorber 2 is attached to the bumper reinforcement member 1 by welding, for example. Thereafter, the chamber member 3 in which the pressure sensor 4 is beforehand mounted is inserted into the space defined between the absorber 2 and the bumper reinforcement member 1, through the side of the opening end thereof.

According to the second embodiment, because the chamber member 3 is mounted after the absorber 2 and the bumper reinforcement member 1 are joined, the mounting of the chamber member 3 can be simply performed.

About the collision detection apparatus, what has not been described in the second embodiment is the same with the first embedment.

Other Embodiment

Although the present invention has been fully described in connection with the preferred embodiments thereof with reference to the accompanying drawings, it is to be noted that various changes and modifications will become apparent to those skilled in the art.

According to the above-described embodiments, it is desirable that the back plate (first support member) is constructed of the bumper reinforcement member 1, so that it becomes unnecessary to add a new component used as the back plate. However, the back plate can be also constructed of other component fixed to the bumper reinforcement member 1 (or crash box) which is fixed to the side members Fm. In this case, it is desirable that the back plate is directly fixed to the side members Fm.

The materials of the back plate 1 and the absorber 2 are not limited. For example, the back plate 1 and the absorber 2 can be made of metal such as iron.

Because the space defined between the back plate 1 and the absorber 2 is provided to house the chamber member 3, it is not required to close the space. That is, the space defined between the back plate 1 and the absorber 2 can be arranged such that the chamber member 3 is readily mounted in the space.

Furthermore, the collision detection apparatus can be also mounted a rear bumper of the vehicle, to detect a collision between an obstacle and the vehicle rear portion.

Moreover, the pressure detection member can be also constructed of an acoustic microphone or the like, instead of the pressure sensor.

Such changes and modifications are to be understood as being in the scope of the present invention as defined by the appended claims.

What is claimed is:

1. A collision detection apparatus, comprising:
    a support member which is fixed to side members of a vehicle;
    an absorber which is arranged at a vehicle front side of the support member to define a space therebetween;
    a chamber member defining therein a chamber space which is substantially sealed, the chamber member being arranged in the space defined between the support member and the absorber; and
    a pressure detection member for detecting a pressure in the chamber space, wherein
    a collision of the vehicle is detected based on a variation in the pressure of the chamber space.

2. The collision detection apparatus according to claim 1, wherein
    a collision with a pedestrian is detected based on a variation in the pressure of the chamber space detected by the pressure detection member.

3. The collision detection apparatus according to claim 1, wherein
    the absorber and the support member construct a substantially cylinder shape having two ends, at least one of which is open,
    the chamber member being inserted in the space between the absorber and the fifth support member through the one end.

4. The collision detection apparatus according to claim 1, wherein
    the absorber and the chamber member are respectively made of materials which are separate from each other.

5. The collision detection apparatus according to claim 4, wherein the chamber member is made of the material which is softer than that of the absorber.

6. The collision detection apparatus according to claim 1, wherein the support member is a bumper reinforcement member of the vehicle.

7. The collision detection apparatus according to claim 1, wherein the collision with a bumper of the vehicle is detected based on the variation in the pressure of the chamber space.

8. The collision detection apparatus according to claim 1, wherein the support member and the absorber are integrally joined to each other.

9. The collision detection apparatus according to claim 1, wherein
    the chamber member has a periphery shape substantially corresponding to a shape of the space defined between the first support member and the absorber.

10. The collision detection apparatus according to claim 1, wherein the pressure detection member is a pressure sensor.

11. The collision detection apparatus according to claim 1, wherein the support member and the absorber are integrally joined to each other by welding.

12. The collision detection apparatus according to claim 1, wherein the support member and the absorber are made of a metal band plate arranged so as to extend substantially in a width direction of the vehicle.

13. A collision detection apparatus, comprising:
    a first support member which is fixed to side members of a vehicle;
    an absorber functioning as a second support member which is arranged at a vehicle front side of the first support member to define a space therebetween;
    wherein the absorber and the first support member construct a substantially cylinder shape having two ends, at least one of which is open;
    a chamber member defining therein a chamber space which is substantially sealed, the chamber member being arranged in the space defined between the first support member and the second support member,
    wherein the chamber member is inserted in the space between the absorber and the first support member through the one end; and
    a pressure detection member for detecting a pressure in the chamber space, wherein
    a collision of the vehicle is detected based on a variation in the pressure of the chamber space.

14. The collision detection apparatus according to claim 13, wherein the absorber and the chamber member are respectively made of materials which are separate from each other.

15. The collision detection apparatus according to claim 14, wherein the chamber member is made of the material which is softer than that of the absorber.

16. The collision detection apparatus according to claim 13, wherein the first support member is a bumper reinforcement member of the vehicle.

17. The collision detection apparatus according to claim 13, wherein the collision with a bumper of the vehicle is detected based on the variation in the pressure of the chamber space.

18. The collision detection apparatus according to claim 13, wherein the first support member and the second support member are integrally joined to each other.

19. The collision detection apparatus according to claim 13, wherein the chamber member has a periphery shape substantially corresponding to a shape of the space defined between the first support member and the second support member.

20. The collision detection apparatus according to claim 13, wherein the pressure detection member is a pressure sensor.

* * * * *